United States Patent
Vivas et al.

(10) Patent No.: US 11,738,385 B2
(45) Date of Patent: Aug. 29, 2023

(54) SMOKE-SUPPRESSING ADDITIVE FOR POLYURETHANE-FORMING BINDER SYSTEM

(71) Applicant: ASK Chemicals LLC, Wilmington, DE (US)

(72) Inventors: Paula Vivas, Dublin, OH (US); Matthew Shoffner, Dublin, OH (US); Lee Horvath, Powell, OH (US)

(73) Assignee: ASK Chemicals LLC, Wilmington, DE (US)

(*) Notice: Subject to any disclaimer, the term of this patent is extended or adjusted under 35 U.S.C. 154(b) by 206 days.

(21) Appl. No.: 16/807,638

(22) Filed: Mar. 3, 2020

(65) Prior Publication Data
US 2021/0276074 A1 Sep. 9, 2021

(51) Int. Cl.
*B22C 1/22* (2006.01)
*B22C 1/02* (2006.01)
*C08K 3/22* (2006.01)

(52) U.S. Cl.
CPC .............. *B22C 1/2273* (2013.01); *B22C 1/02* (2013.01); *C08K 3/22* (2013.01); *C08K 2003/2268* (2013.01); *C08K 2003/2272* (2013.01); *C08K 2003/2275* (2013.01)

(58) Field of Classification Search
CPC ................................ B22C 1/22; B22C 1/2273
See application file for complete search history.

(56) References Cited

U.S. PATENT DOCUMENTS

| | | | |
|---|---|---|---|
| 3,485,797 A | 12/1969 | Robins | |
| 3,676,392 A | 7/1972 | Robins | |
| 4,124,556 A | 11/1978 | Schafer et al. | |
| 4,457,352 A * | 7/1984 | Scheffer | B22D 29/00 164/124 |
| 5,085,706 A | 2/1992 | Kuske et al. | |
| 5,101,001 A * | 3/1992 | Henry | C08G 18/20 528/162 |
| 5,616,631 A | 4/1997 | Kiuchi et al. | |
| 5,651,815 A | 7/1997 | Galloway, III et al. | |
| 6,391,942 B1 | 5/2002 | Chang et al. | |
| 6,479,567 B1 | 11/2002 | Chang | |
| 6,559,203 B2 | 5/2003 | Hutchings et al. | |
| 6,602,931 B2 | 8/2003 | Chen et al. | |
| 6,719,835 B2 * | 4/2004 | Brown | B22C 1/02 164/520 |
| 7,125,914 B2 | 10/2006 | Chang | |
| 7,984,750 B2 | 7/2011 | Pederson et al. | |
| 8,215,373 B2 | 7/2012 | Kloskowski et al. | |
| 2005/0009950 A1 | 1/2005 | Dando | |
| 2011/0220316 A1 | 9/2011 | Fuqua et al. | |

OTHER PUBLICATIONS

Liu, Xiu et al., Recent studies on the decomposition and strategies of smoke and toxicity suppression for polyurethane based materials, Royal Society of Chemistry article, Jun. 30, 2016, 15 pages.
Chen, Xilei et al., "Influence of Iron Oxide Brown on Smoke-Suppression Properties and Combustion Behavior of Intumescent Flame-Retardant Expoxy Composites", Advances in Polymer Technology, vol. 34, No. 4, 2015, 21516.

* cited by examiner

*Primary Examiner* — Vickey Nerangis
(74) *Attorney, Agent, or Firm* — Standley Law Group LLP; Jeffrey S. Standley; Kenny W. Pung

(57) ABSTRACT

A sand additive for use in a "no bake" foundry mix composition having a polyurethane-based binder system reduces the amount of smoke emitted when molds and cores formed from the composition are exposed to molten metal, as compared to when the sand additive is not used. The sand additive comprises yellow iron oxide having the chemical formula $Fe(OH)_3$. It can also comprise at least one of red iron oxide, black iron oxide and wüstite. In such cases, the yellow iron oxide accounts for about 10 to about 40 weight percent of the combined weight of the yellow iron oxide, red iron oxide, black iron oxide and wüstite, and preferably, about 20 to about 30 weight percent of the combined weight of the yellow iron oxide, red iron oxide, black iron oxide and wüstite.

4 Claims, No Drawings

SMOKE-SUPPRESSING ADDITIVE FOR POLYURETHANE-FORMING BINDER SYSTEM

CROSS-REFERENCE TO RELATED APPLICATIONS

This application is a non-provisional application that makes no priority claim.

TECHNICAL FIELD

This disclosure relates to an additive for a binder system used for casting metal parts, using molds and cores formed using a polyurethane-forming binder system. More particularly, it relates to a foundry mix containing an appropriate foundry aggregate and two polyurethane binder precursors. A liquid catalyst is used to cure the polyurethane formed from mixing the precursors. Smoke generated from decomposition of organic compounds used in the binders is suppressed through the use of a yellow iron oxide ("YIO") additive.

BACKGROUND

Molds and cores used in the casting of metal articles can be made from a foundry aggregate and or a foundry sand, held together by a foundry binder. Several processes are used for this.

In a "no-bake" process, a foundry mix is prepared by mixing an appropriate aggregate with the binder and a curing catalyst. After compacting the foundry mix into a pattern, the curing of the foundry mix provides a foundry shape useful as a mold or core.

In a "cold box" process, a foundry mix is prepared by mixing an appropriate aggregate with a binder. After forcing the foundry mix into a pattern, a catalyst vapor is passed through the foundry mix, causing it to cure and provide a foundry shape useful as a mold or core.

In yet a further process, the foundry mix is prepared by mixing the aggregate with a heat reactive binder and catalyst. The foundry mix is shaped by compacting it into a heated pattern that causes the foundry mix to cure, providing a foundry shape useful as a mold or core.

Focusing on the "no-bake" processes, then, some widely used binders in the foundry industry for the "no-bake" process include phenolic urethane no-bake binders, ester-cured phenolic no-bake binders and furfuryl alcohol acid curing no-bake binders.

The assignee of the present invention has been significantly involved in providing foundry binders for over forty years. Some representative US patents and published applications include U.S. Pat. Nos. 3,485,797 and 3,676,392 to Robins, U.S. Pat. Nos. 6,391,942, 6,479,567 and 7,125,914 to Chang, U.S. Pat. No. 6,559,203 to Hutchings, U.S. Pat. No. 6,602,931 to Chen and US published application US 2005/0009950 to Dando.

Several variables have been considered when formulating binder packages. For example, U.S. Pat. No. 5,616,631, to Kiuchi, teaches that prior no-bake binders have tended to have low curing rates and low initial strength. A long time is needed for the binder to set up sufficiently to allow the cured mold to be removed from the pattern, which results in poor utilization of the pattern. In the terminology of the present specification, the "strip time" is the time that elapses from when the binder components are mixed with the sand or aggregate until the foundry shape formed reaches a level of 90 on the on the Green Hardness "B" scale, using the gauge sold by Harry W. Dietert Co, of Detroit, Mich., as is taught by the commonly-owned Chen '931 patent. Kiuchi '631 teaches that it is a desired result to increase the initial tensile strength, so as to keep the strip time short.

Another term used in the prior art and in this specification is "work time." In this specification, the rigorous definition of work time is the time between when the binder components and the aggregate and sand are mixed and when the foundry shape formed therefrom attains a level of 60 on the Green Hardness "B" scale, again using the gauge from Dietert. In terms more applicable to the foundry, the "work time" defines the approximate time during which the sand mix can be effectively worked in forming the mold and core. The difference between strip time and work time is, therefore, an amount of dead time during which the mold being formed cannot be worked upon, but cannot yet be removed from the pattern. The ratio of work time to strip time ("W/S") expresses this concept in a dimensionless manner, and ranges (at least in theory) from 0 to 1.

Ultimately, designers of foundry binder systems have the objective to providing a binder system that will use the heat from the poured molten metal to decompose the binder once a solid skin has been formed on the metal in the mold that reproduces the shape of the mold core. This decomposition allows the sand and/or other aggregate to be readily recovered and reused. As taught by U.S. Pat. No. 7,984,750, to Pederson, this need to decompose the binder is challenged when the mold is used with a metal poured at a temperature that is lower than the approximately 1000° C. at which cast iron is poured. Aluminum and magnesium are examples of such metals.

Almost as important as the ability to decompose the binder is to provide a binder that is environmentally acceptable. Because of the exposure of workers to the foundry mix both before casting and after, issues such as smoke, toxicity and odor must be considered, although the materials involved effectively limit the discussion to reduction rather than elimination.

Clearly, the ability to provide proper tensile strength and working time are pre-eminent and any additive that acts to suppress smoke and odor must not result in a sacrifice of casting quality, although some compromises may need to be made to assure compliance with environmental health and safety.

It is therefore an object to provide an improved binder system which meets job qualifications while suppressing at least smoke production.

SUMMARY

This and other objects are met by a foundry mix composition, comprising: a polyurethane binder precursor, provided in two parts, the first part comprising a polyol component and the second part comprising a polyisocyanate component; a liquid curing catalyst; an appropriate foundry aggregate; and a sand additive, comprising yellow iron oxide.

In many embodiments, the liquid curing catalyst is present in the range of about 4 to about 8 weight percent based on the weight of the first part of the polyurethane binder component. In many embodiments, the liquid curing catalyst is kept separate from at least the second part of the polyurethane binder precursor until use.

In many embodiments, the sand additive further comprises at least one of red iron oxide, black iron oxide and wüstite.

In many embodiments, the sand additive is present in the amount of about 3 to about 5 weight percent, based on the foundry aggregate.

In many embodiments, the yellow iron oxide in the sand additive accounts for about 10 to about 40 weight percent of the combined weight of the yellow iron oxide, red iron oxide, black iron oxide and wüstite. More preferably, the yellow iron oxide in the sand additive accounts for about 20 to about 30 weight percent of the combined weight of the yellow iron oxide, red iron oxide, black iron oxide and wüstite.

In many embodiments, the appropriate foundry aggregate comprises a silica sand.

Some embodiments of the inventive concept are a sand additive for use in a "no bake" foundry mix composition to reduce smoke emissions, comprising yellow iron oxide. In many of such embodiments, the sand additive further comprises at least one of red iron oxide, black iron oxide and wüstite.

In some of these embodiments, the yellow iron oxide in the sand additive accounts for about 10 to about 40 weight percent of the total weight of the yellow iron oxide, red iron oxide, black iron oxide and wüstite. More preferably, the yellow iron oxide in the sand additive accounts for about 20 to about 30 weight percent of the total weight of the yellow iron oxide, red iron oxide, black iron oxide and wüstite.

DETAILED DESCRIPTION

It was observed by the inventors in work involving the intensity of smoke originating in the use of an organic binder system in metal casting that inclusion of a red iron oxide ("RIO") additive did little or nothing to suppress the smoke, but that inclusion of a yellow iron oxide ("YIO") caused dramatically lower smoke generation, to the tune of about an order of magnitude. Another iron oxide, known variously as black iron oxide, magnetite, or iron (II, III) oxide, has the chemical formula $Fe_3O_4$ and CAS number 1317-61-9. A yet further iron oxide, known as wüstite or iron (II) oxide, has the chemical formula FeO.

Red iron oxide is an iron (III) oxide having a chemical formula $Fe_2O_3$, also referred to as hematite. It has CAS number 90452-21-4.

Yellow iron oxide is an iron (III) oxide-hydroxide, the monohydrate of which has the chemical formula FeO(OH)($H_2O$), which has CAS number 51274-00-1. It is also referred to as iron (III) hydroxide, $Fe(OH)_3$, hydrated iron oxide, or, in pigment applications, as Pigment Yellow 42. Upon heating, it decomposes and recrystallizes as $Fe_2O_3$.

VEINO ULTRA 350 is a commercially available sand additive that is used to reduce the amount of veining that occurs in metal casting. It contains a blend of $Fe_2O_3$, $Fe_3O_4$ and FeO.

PEP SET MAGNA 1215/2215 is a commercially-available polyurethane-forming binder system. The binder system is sold in two separately-packaged components. The first part, commonly referred to as Part I, designated 1215, contains phenolic resole resin, dibasic esters and solvent naphtha, along with performance additives. The second part, commonly referred to as Part II, designated 2215, provides an isocyanate component, rapeseed methyl ester and solvent naphtha, along with performance additives. Parts I and II are mixed and a liquid amine catalyst is added. PEP SET 3401 CATALYST contains 4-phenyl propyl pyridine and solvent naphtha.

In the experimental protocol, test cores were prepared. The 1215 component and the catalyst, in this case, a commercially-available 3401 catalyst were mixed with round silica sand sold commercially as WEDRON 410 sand. Then, the 2215 component was added. The weight ratio of the 1215 component to the 2215 component was 60/40, exclusive of the catalyst, and the binder level was 1.2% by weight, based on sand ("BOS"). The catalyst was added at 4% by weight based on Part 1. In one case, no smoke-suppressing additive was added, to establish a baseline. Against this, a 3% by weight BOS of VEINO ULTRA 350 ("VU350") was tested, as was a mixture of the VEINO ULTRA 350 and yellow iron oxide (YIO), in a 70/30 ratio. The mixture was also at 3% by weight BOS.

Once mixed, the resulting foundry mix was compacted into a tensile specimen in the shape of a dogbone, using a shaped core pattern. The resulting test specimens ("dogbones") were tested for tensile strength at one hour, three hours and 24 hours, this last example being conducted at the same humidity level as the 1 and 3 hour tests. There was also a 24 hour test at a high relative humidity, after removal from the core pattern.

The test provides the following data for tensile strength (in psi):

TABLE 1

| Additive | 1 h | 3 h | 24 h | 24 h-RH |
|---|---|---|---|---|
| None | 231.4 | 282.6 | 350.2 | 96.1 |
| VEINO ULTRA 350 | 168.7 | 207.6 | 259.0 | 83.7 |
| VU350/YIO | 110.4 | 154.5 | 210.1- | 121.4 |

From these, it is noted that the tensile strength dropped at each time when VU350 was added to the base case and that mixing YIO with the VU350 resulted in an even further drop. However, this is a known effect of sand additives, so lower tensile strength is not inherently a problem, provided that threshold values of tensile strength are met.

Since the first test was conducted at 4% catalyst, a further set of data was generated with the same binder system, while increasing the catalyst level to 8% and adjusting the weight ratio of the additive mixture.

When this was done, the following data were obtained at 8% catalyst:

TABLE 2

| Additive | 1 h | 3 h | 24 h | 24 h-RH |
|---|---|---|---|---|
| VU350/YIO (70/30) | 147.4 | 178.8 | 182.0 | 87.2 |
| VU350/YIO (80/20) | 176.0 | 221.0 | 202.3 | 81.4 |
| VU350/YIO (90/10) | 193.3 | 239.1 | 243.3- | 91.8 |

These data can be compared directly against Table 1, and particularly, the baseline "No additive" case of Table 1.

The terms "strip time" and "work time" are described in detail above, with reference to U.S. Pat. No. 5,616,631, to Kiuchi. Further detail is found in commonly-owned U.S. Pat. No. 6,602,931 to Chen. Knowing that "no-bake" binders have tended to have low curing rates and low initial strength, it was desirable to understand the effects of any smoke-reducing additive on these properties.

The difference between strip time and work time is an amount of dead time during which the mold being formed cannot be worked upon, but cannot yet be removed from the pattern. The ratio of work time to strip time ("W/S") expresses this concept in a dimensionless manner, and ranges (at least in theory) from 0 to 1. A long work time and a high ratio of W/S are desirable.

The formulations in Tables 1 and 2 were tested for "work time" and "strip time" and the data are provided in Table 3:

TABLE 3

| Additive | Catalyst % | Work time (m:s) | Strip time (m:s) | w/s |
|---|---|---|---|---|
| None | 4 | 6:00 | 7:00 | 0.86 |
| VU350 | 4 | 5:30 | 7:30 | 0.73 |
| VU350/YIO (70/30) | 4 | 9:15 | 11:15 | 0.82 |
| VU350/YIO (70/30) | 8 | 5:30 | 6:45 | 0.81 |
| VU350/YIO (80/20) | 8 | 5:30 | 6:30 | 0.85 |
| VU350/YIO (90/10) | 8 | 5:15 | 6:00 | 0.875 |

These data show that the combination of 4% catalyst and the mixture of 70/30 VU350/YIO provides significantly longer work time. All of the W/S ratios are close, with the possible exception of the 4% catalyst with only VU350 as the additive.

Based on the foregoing data, some selection can start to be made. A first criterion is based on the fact that smoke reduction should not be achieved at the cost of an unacceptable loss in tensile strength. Defining the standard in these experiments to be the 282.6 psi tensile strength seen above for the "no-additive" system with 4% catalyst, and deciding that the 207.6 psi tensile strength obtained using VEINO ULTRA 350 at 3%, with 4% catalyst, demonstrates a result that can be achieved with state-of-the-art systems, comparisons may be made. For example, from data in Table 1, the VEINO ULTRA 350 system lost 75 psi in strength, representing a 26.5% loss from "no-additive". In Table 4 below, two systems are noted to have less tensile strength loss after three hours than the VU350 system, although both required a higher catalyst level.

Two other systems, while having tensile strength loss that exceeded the VU350 system, exhibited work time and W/S ratios that provide them with continuing interest.

Also included in Table 4 are data involving smoke reduction.

TABLE 4

| Additive | Catalyst % | Tensile strength lost (%) | Smoke reduction (%) |
|---|---|---|---|
| None | 4 | 0.0 | 0.0 |
| VU350 | 4 | 26.5 | 14.7 |
| VU350/YIO (90/10) | 8 | 15.4 | 27.3 |
| VU350/YIO (80/20) | 8 | 21.8 | 31.7 |
| VU350/YIO (70/30) | 8 | 36.7 | 35.9 |
| VU350/YIO (70/30) | 4 | 45.3 | 36.1 |

The smoke reduction data in Table 4 were obtained from polyurethane no-bake cores made with the PEPSET MAGNA 1215/2215 binder system. All additives were run at 3.0% BOS, and the cores were allowed to rest for 24 hours before measurements were taken. The cores were then cut into pieces of similar mass and heated for 2 minutes at 700° C. immediately prior to measuring. Once removed from the oven, the cores were placed on an instrument stage and raised into a chamber. In the instrument, the emitted smoke passes through a vertical tube having an array of lights on a first side thereof and photocells on the opposite side. The reduction in light transmission through the tube is considered as the rate of "smoke emission." The instrument measures the rate of smoke emitted from the sample every 0.2 seconds and logged the rate data in a data file. After 180 seconds, the emissions of every sample had returned to roughly 0, so the recorder was stopped and the core removed. The stage was then cleaned with air, and each sample was tested twice.

To account for slight variations in the core size between measurements, all data were normalized to the average core mass of all samples. The two measurements made for each sample were normalized in this manner and then averaged together. To determine the total emissions for each sample over time, an integral representing the area under the average emission rate curve was needed. This was done by summing the averaged measurements over 180 seconds and multiplying them by 0.2 (the sampling rate of the experiment). All samples were then compared to the "no additive" sample as a baseline in the experiment.

In another test of emissions reduction, or perhaps more descriptively, BTXN emissions reduction, the same core preparation steps were performed at a different facility. In that test, after heating for two minutes at 950° C., the off-gas was analyzed as to the amount of benzene ("B"), toluene ("T"), xylene ("X", including ortho-, para- and meta-) and naphthalene ("N") emitted during the test, with a similar normalized integration of two samples of each composition. While keeping in mind that chemical analysis for individual components rather than changes in light transmission would lead to some differences from the data in Table 4, as well as experimental differences in the samples, the data in Table 5 were obtained, with 4% catalyst used in each instance. In each case, the number reported is mg/kg of core weight. The percentage reduction is based on comparison against the "no additive" test.

TABLE 5

| Additive | B | T | X | N | Total | Reduction (%) |
|---|---|---|---|---|---|---|
| None | 741 | 95.5 | 34 | 223 | 1093.5 | 0 |
| VU350 | 630 | 70.5 | 19 | 201 | 920.5 | 15.8 |
| VU350/YIO (80/20) | 557 | 52.5 | 14 | 140.5 | 764 | 30.1 |

The BTXN emissions reductions observed were, in each case, very comparable to those observed in the light transmission test. This is particularly notable in view of the quite different nature of the tests used.

In all cases tested, the sand additives, whether VU 350 or a VU 350/YIO mixture, were blended with the sand prior to the addition of the binder. In none of the tests was the sand additive added to the formed foundry shape, perhaps as a coating. However, there is no reason to believe that dispersion of the sand additive in the foundry shape and coating of the sand additive on the surfaces would necessarily result in distinctly different results.

What is claimed is:

1. A "no bake" foundry mix composition, comprising:
a polyurethane binder precursor, provided in two parts, the first part comprising a polyol component and the second part comprising a polyisocyanate component;
a liquid curing catalyst, present in the range of about 4 to about 8 weight percent based on the weight of the first part of the polyurethane binder component;
a foundry aggregate; and
an anti-veining additive, comprising yellow iron oxide, red iron oxide, black iron oxide, and wüstite, wherein the yellow iron oxide is present at between 10 and 30 wt. % of the total weight of the anti-veining additive.

2. The foundry mix composition of claim 1, wherein:
the liquid curing catalyst is kept separate from at least the second part of the polyurethane binder precursor until use.

3. The foundry mix composition of claim 1, wherein:
the anti-veining additive is present in the amount of about 3 to about 5 weight percent, based on the foundry aggregate.

4. The foundry mix composition of claim 1, wherein:
the foundry aggregate is a silica sand.

* * * * *